US008249857B2

(12) United States Patent
Bodin et al.

(10) Patent No.: US 8,249,857 B2
(45) Date of Patent: Aug. 21, 2012

(54) MULTILINGUAL ADMINISTRATION OF ENTERPRISE DATA WITH USER SELECTED TARGET LANGUAGE TRANSLATION (75) Inventors: William K. Bodin, Austin, TX (US); David Jaramillo, Lake Worth, FL (US); Ann Marie G. Maynard, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 12/108,738

(22) Filed: Apr. 24, 2008

(65) Prior Publication Data
US 2009/0271175 A1    Oct. 29, 2009

(51) Int. Cl.
G06F 17/28    (2006.01)
(52) U.S. Cl. .................................. 704/2; 704/8
(58) Field of Classification Search .................. 704/2, 8
See application file for complete search history.

(56) References Cited

U.S. PATENT DOCUMENTS

| | | | |
|---|---|---|---|
| 5,802,314 A | 9/1998 | Tullis et al. | |
| 6,665,642 B2* | 12/2003 | Kanevsky et al. | 704/260 |
| 6,678,720 B1 | 1/2004 | Matsumoto et al. | |
| 7,219,136 B1* | 5/2007 | Danner et al. | 709/219 |
| 2001/0029455 A1* | 10/2001 | Chin et al. | 704/277 |
| 2003/0163300 A1* | 8/2003 | Kasvand et al. | 704/2 |
| 2004/0006560 A1* | 1/2004 | Chan et al. | 707/3 |
| 2004/0102957 A1* | 5/2004 | Levin | 704/3 |
| 2004/0128136 A1* | 7/2004 | Irani | 704/270.1 |
| 2004/0202957 A1 | 10/2004 | Murota | |
| 2005/0162551 A1* | 7/2005 | Baker | 348/468 |
| 2006/0271352 A1* | 11/2006 | Nikitin et al. | 704/9 |
| 2007/0178918 A1 | 8/2007 | Shon | |
| 2007/0198273 A1* | 8/2007 | Hennecke | 704/277 |
| 2007/0208687 A1* | 9/2007 | O'Conor et al. | 707/1 |
| 2007/0288488 A1* | 12/2007 | Rohrs et al. | 707/100 |
| 2008/0062314 A1 | 3/2008 | Yoo et al. | |
| 2008/0162472 A1* | 7/2008 | Cheng et al. | 707/6 |
| 2008/0300852 A1* | 12/2008 | Johnson et al. | 704/2 |
| 2009/0006342 A1* | 1/2009 | Wong et al. | 707/4 |
| 2009/0112575 A1* | 4/2009 | Sakashita et al. | 704/8 |
| 2009/0187577 A1* | 7/2009 | Reznik et al. | 707/10 |
| 2009/0271176 A1 | 10/2009 | Bodin et al. | |

FOREIGN PATENT DOCUMENTS

CN    101035090    9/2007

OTHER PUBLICATIONS

Office Action, U.S. Appl. No. 12/108,738, Mail Date Jan. 20, 2011.
Office Action, U.S. Appl. No. 12/108,751, Mail Date Jan. 20, 2011.
"U.S. Appl. No. 12/416,290 Office Action", Nov. 1, 2010, 16 pages.
"U.S. Appl. No. 12/108,751 Final Office Action", Jun. 9, 2011, 14 pages.
"U.S. Appl. No. 12/108,751 Office Action", Nov. 7, 2011, 13 pages.

* cited by examiner

*Primary Examiner* — Jakieda Jackson
(74) *Attorney, Agent, or Firm* — DeLizio Gilliam PLLC (57) ABSTRACT

Methods, systems, and computer program products are provided multilingual administration of enterprise data. Embodiments include retrieving enterprise data; extracting text from the enterprise data for rendering from a digital media file, the extracted text being in a source language; prompting a user to select a target language; receiving from the user a selection of a target language; translating the extracted text in the source language to translated text in the target language; converting the translated text to synthesized speech in the target language; and recording the synthesized speech in the target language in a digital media file.

20 Claims, 7 Drawing Sheets

MULTILINGUAL ADMINISTRATION OF ENTERPRISE DATA WITH USER SELECTED TARGET LANGUAGE TRANSLATION

BACKGROUND OF THE INVENTION

1. Field of the Invention

The field of the invention is data processing, or, more specifically, methods, systems, and products for multilingual administration of enterprise data.

2. Description of Related Art

Today's world economy reflects dramatically increasing international trade and cultural exchange. This economic landscape is complex considering that the vast majority of the world's population needs or prefers a language other than English to carry out business functions. As international trade and cultural exchange continues to grow, the need for multilingual support for business users will also continue to grow.

SUMMARY OF THE INVENTION

Methods, systems, and computer program products are provided for multilingual administration of enterprise data. Embodiments include retrieving enterprise data; extracting text from the enterprise data for rendering from a digital media file, the extracted text being in a source language; prompting a user to select a target language; receiving from the user a selection of a target language; translating the extracted text in the source language to translated text in the target language; converting the translated text to synthesized speech in the target language; and recording the synthesized speech in the target language in a digital media file.

The foregoing and other features of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
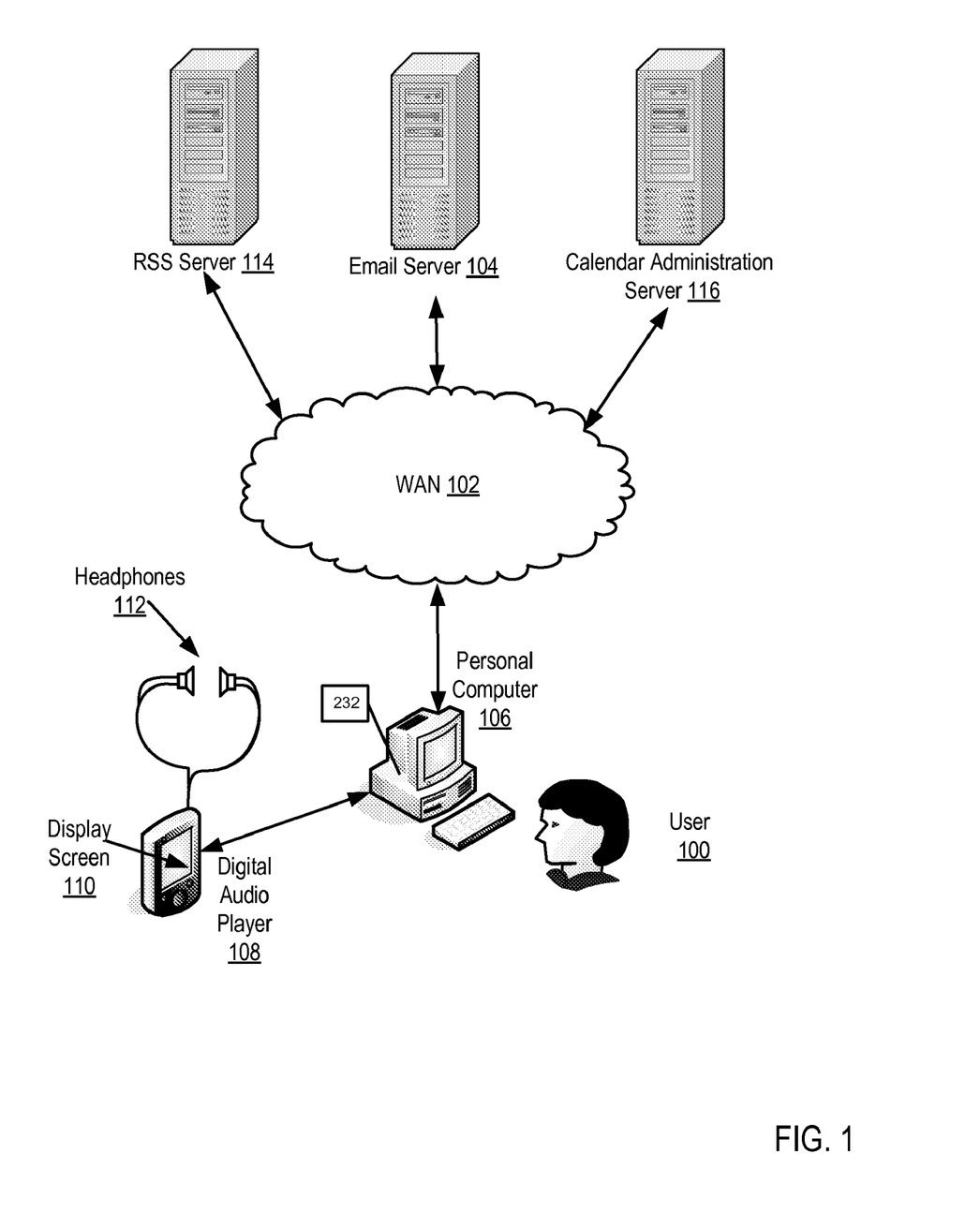
FIG. 1 sets forth a network diagram illustrating an example system for multilingual administration of enterprise data according to embodiments of the present invention.

Example methods, systems, and products for multilingual administration of enterprise data according to embodiments of the present invention are described with reference to the accompanying drawings, beginning with FIG. 1. FIG. 1 sets forth a network diagram illustrating an example system for multilingual administration of enterprise data according to embodiments of the present invention. Enterprise data is data commonly used within in an organization, typically a business organization. Such enterprise data may include data that is published to users within the organization such as calendar entries and RSS (Really Simple Syndication) feeds or may be information shared among users in the organization such as email messages, instant messages, or other data as will occur to those of skill in the art. Enterprise data according to the present invention may also include data shared between users of different organizations as well, such as for example, email messages, instant messages, published RSS feeds, web content, and other enterprise data that will occur to those of skill in the art.

The system of FIG. 1 includes three enterprise data servers, an RSS server (114), an email server (104), and a calendar administration server (116), each coupled for data communications with a personal computer (106) through a wide area network (102) ('WAN'). The RSS server (114) of FIG. 1 serves up RSS feeds. RSS ('Really Simple Syndication') is a broad term describing a family of XML file formats for web syndication used by news websites, weblogs, and other content providers. The abbreviation is often used to refer to the following example standards: Rich Site Summary (RSS 0.91), RDF Site Summary (RSS 0.9, 1.0 and 1.1), and Really Simple Syndication (RSS 2.0).

In the example of FIG. 1, the RSS server (114) provides access to content through an RSS feed delivered to an RSS aggregator installed on the personal computer (106). An RSS feed is typically an XML file that contains summaries and other metadata describing content available on the RSS server (114) together with links to the full content on the RSS content server (114). A user may then view the RSS feed and access content delivered through the RSS feed through a browser installed on the personal computer.

The email server (104) of FIG. 1 is an application that controls the distribution and storage of e-mail messages according to a particular email protocol. For example, Simple Mail Transfer Protocol ('SMTP') is a protocol for sending email messages between servers. Most email systems that send mail over the Internet use SMTP to send messages from one server to another. Email messages can then be retrieved with an email client using either Post Office Protocol ('POP') or the Interne Map Access Protocol ('IMAP').

The calendar administration server (116) maintains calendaring information of users such as calendar entries which may be published to other users in an organization or calendar entries maintained privately to one or more users in the organization. The calendar administration server (116) of FIG. 1 allows multiple users to collaboratively share calendaring information. It provides a shared location on the network to store schedules, and allows users to send each other and manage invitations to events. Examples of calendar administration serves useful with multilingual administration of enterprise data according to embodiments of the present invention include the Darwin Calendar Server available from Apple Computer, the Sun Java System Calendar Server available from Sun® Microsystems, Common Calendar for use with WebSphere available from IBM®.

The system of FIG. 1 also includes a personal computer (106). The personal computer (106) of FIG. 1 has installed upon it an enterprise data administration module (232) that operates generally to carry out multilingual administration of enterprise data according to embodiments of the present invention by retrieving enterprise data from the enterprise data servers (114, 104, and 116); extracting text from the enterprise data retrieved from the enterprise data servers (114, 104, and 116) for rendering from a digital media file, the extracted text being in a source language; prompting a user to select a target language; receiving from the user a selection of a target language; translating the extracted text in the source language to translated text in the target language; converting the translated text to synthesized speech in the target language; and recording the synthesized speech in the target language in a digital media file. The enterprise data administration module installed on the personal computer (106) of FIG. 1 is also capable of storing the media file on a digital audio player (108) and the digital audio player is then capable of playing the media file on the digital audio player thereby rendering the synthesized speech in the target language.

The enterprise data administration module (232) installed on the personal computer (106) of FIG. 1 is also capable of receiving through a graphical user interface ('GUI') selection screen a selection of an identification of one of a plurality of available target languages and is also capable of displaying in a GUI text box the text in the source language together with the translated text in the target language. The enterprise data administration module (232) installed on the personal computer (106) of FIG. 1 is also capable of storing the translated text as metadata associated with the media file. The metadata describing the media file may be displayed either on the personal computer of on the display screen (110) of the digital audio player (108) thereby rendering the translated text of the enterprise data.

The system of FIG. 1 also includes a digital audio player (108). A digital audio player of FIG. 1 is capable of playing media files such as for example, MPEG files, AAC compressed .mp4 files, and others as will occur to those of skill in the art. The digital audio player of FIG. 1 also includes a display screen (110) capable of displaying information stored as metadata associated with media files of the file types supported by the digital audio player. The digital audio player also includes headphones (112) for audio presentation of the audio portions of media files supported by the digital audio player.

The arrangement of servers and other devices making up the example system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Multilingual administration of enterprise data in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an example computer (106) useful in multilingual administration of enterprise data according to embodiments of the present invention. The computer (106) of FIG. 2 includes at least one computer processor (156) or 'CPU' as well as random access memory (168) ('RAM') which is connected through a system bus (160) to processor (156) and to other components of the computer.

Figure 2:
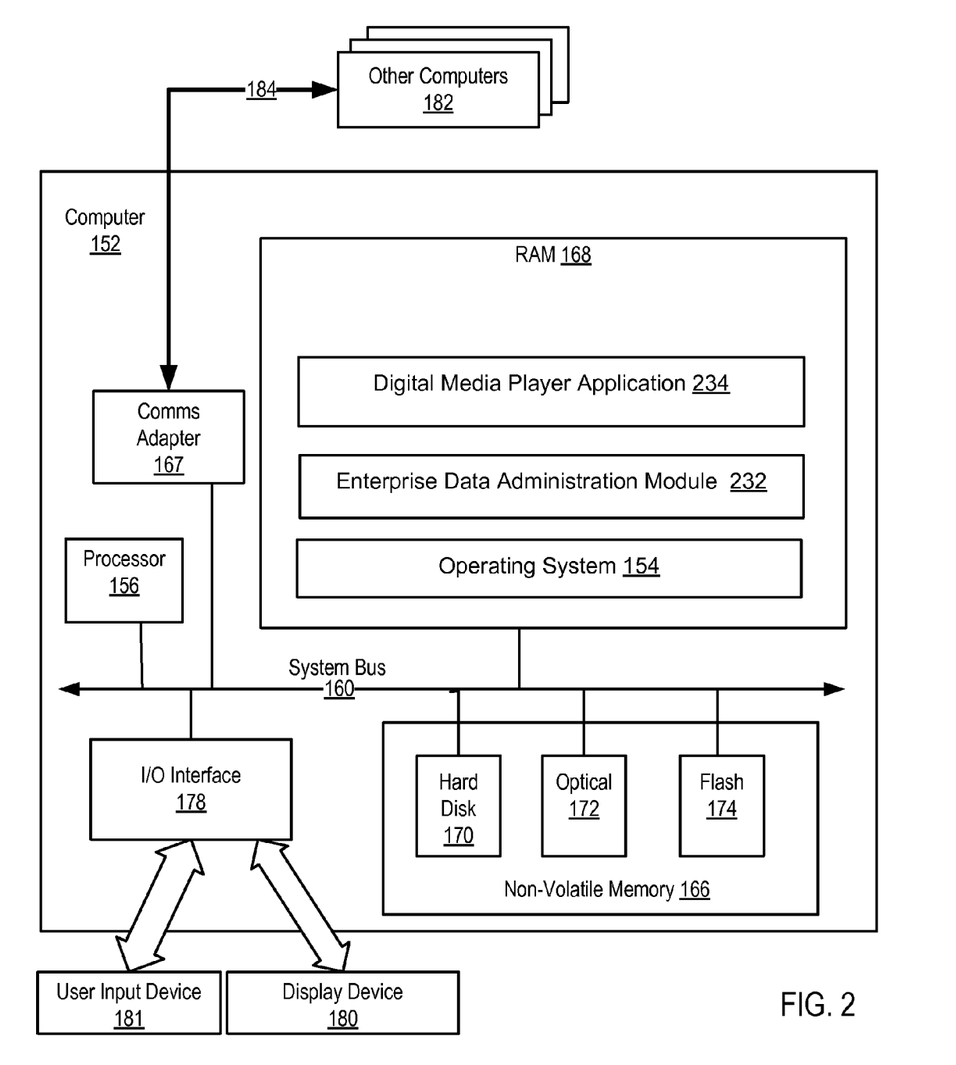
FIG. 2 sets forth a block diagram of automated computing machinery comprising an example computer useful in multilingual administration of enterprise data according to embodiments of the present invention.

Stored in RAM (168) is an operating system (154). Operating systems useful in computers according to embodiments of the present invention include UNIX™, Linux™, Microsoft XP™, AIX™, IBM's i5/OS™, and others as will occur to those of skill in the art.

Also stored in RAM (168) is an enterprise data administration module (232). The enterprise data administration module (232) of FIG. 2 includes computer program instructions for multilingual administration of enterprise data that include computer program instructions for retrieving enterprise data; extracting text from the enterprise data for rendering from a digital media file, the extracted text being in a source language; prompting a user to select a target language; receiving from the user a selection of a target language; translating the extracted text in the source language to translated text in the target language; converting the translated text to synthesized speech in the target language; and recording the synthesized speech in the target language in a digital media file. The enterprise data administration module (232) of FIG. 2 also includes computer program instructions for storing through the digital media player application (234) the media file on a digital audio player. The media file may then be played on the on the digital audio player thereby rendering the synthesized speech in the target language. The enterprise data administration module (232) also includes computer program instructions for storing (338) the translated text (318) as metadata associated with the media file.

The enterprise data administration module (232) of FIG. 2 is also capable of receiving through a graphical user interface ('GUI') selection screen a selection of an identification of one of a plurality of available target languages and is also capable of displaying in a GUI text box the text in the source language together with the translated text in the target language. The enterprise data administration module (232) of FIG. 2 is also capable of storing the translated text as metadata associated with the media file. The metadata describing the media file may be displayed either on the computer of on the display screen (110) of the digital audio player (108) thereby rendering the translated text of the enterprise data.

Also stored in RAM (168) is a digital media player application (234). A digital media player application (234) is an application that manages media content such as audio files and video files. Such digital media player applications are typically capable of transferring media files to a digital audio player. Examples of digital media player applications include Music Match™, iTunes® and others as will occur to those of skill in the art.

The operating system (154), enterprise data administration module (232), and digital media player application (234) in the example of FIG. 2 are shown in RAM (168), but many components of such software may be stored in non-volatile memory (166) also.

Computer (106) of FIG. 2 includes non-volatile computer memory (166) coupled through a system bus (160) to processor (156) and to other components of the computer (106). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The example computer (106) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful according to embodiments of the present invention include modems for wired dial-up communications, Ethernet (IEEE 802.3) adapters for wired network communications, and 802.11b adapters for wireless network communications.

Multilingual administration of enterprise data include both administering enterprise data for rendering as synthesized speech from the audio portion of a media file or for rendering the enterprise data on a display screen of a digital audio player. For further explanation, FIG. 3 sets forth a flow chart illustrating an example method for multilingual administration of enterprise data according to embodiments of the present invention. The method of FIG. 3 includes retrieving (302) enterprise data (304). The enterprise data of FIG. 3 includes email messages (800), RSS feeds (802), and calendar entries (804). The examples of email messages, RSS feeds, and calendar entries are included for ease explanation and not for limitation. As mentioned above, enterprise data may include may other forms of data such as for example instant messages, web content, and other data that will occur to those of skill in the art.

Figure 3:
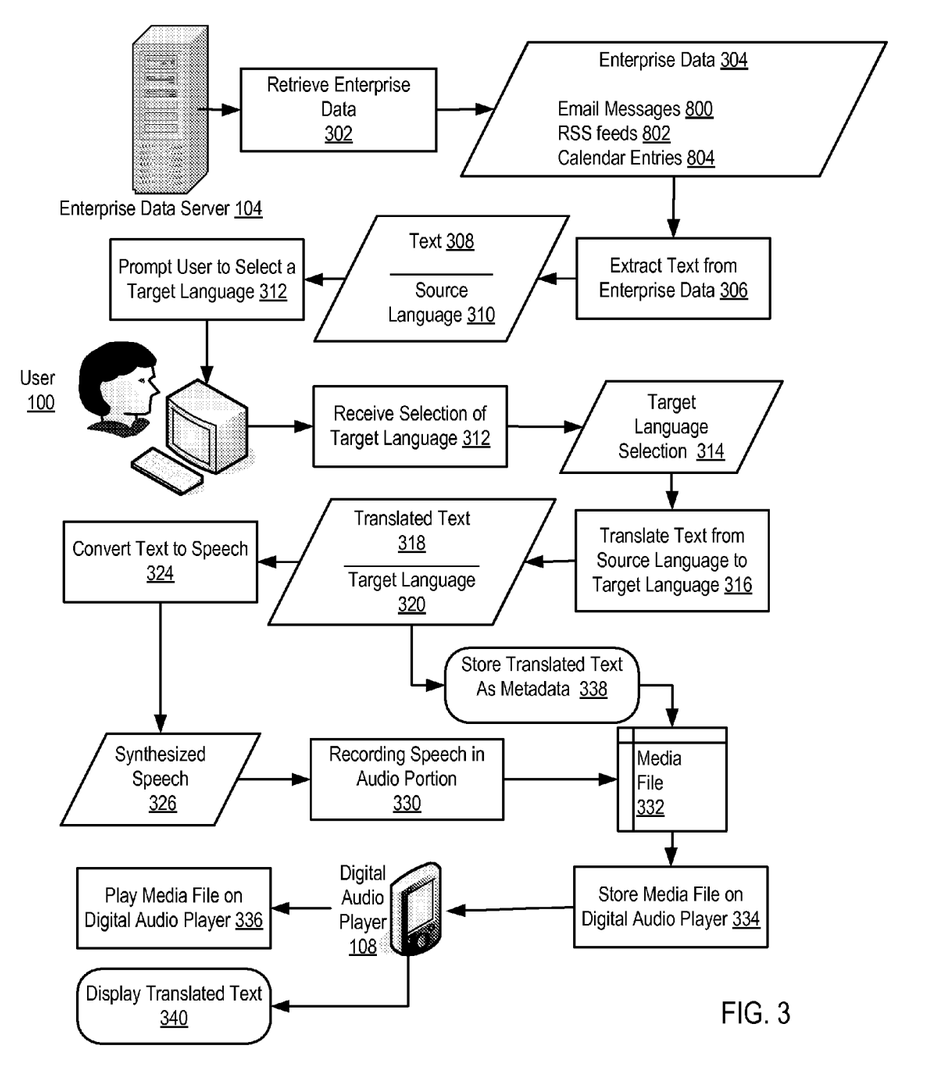
FIG. 3 sets forth a flow chart illustrating an example method for multilingual administration of enterprise data according to embodiments of the present invention.

The method of FIG. 3 also includes extracting text (306) from the enterprise data (304) for rendering from a digital media file, the extracted text (308) being in a source language (310). Extracting text (306) from the enterprise data may be carried out by identifying and copying the text from the principal parts of the enterprise data that includes text providing the content of the enterprise data and often metadata for the enterprise data. The copied text may then be stored for translation to a target language selected by a user. The principal parts of an email message, for example, are the header, the body, and any attachments to the email. The header contains information including sender, intended recipient, date, intended courtesy copy recipients, subject of the message, and others as will occur to those of skill in the art. The body of the email message contains the content of the message itself. The attachments are typically files attached to the email message. Extracting text from an email message, for example, according to the method of FIG. 3 may include extracting text from an email message header. Extracting text from the email message according to the method of FIG. 3 may also include extracting text from an email message body. RFC 822 outlines a standard specifying the syntax for messages within the framework of email.

As discussed above, RSS content is typically presented in a web page or other markup document accessible through a browser. Such a web page or markup document therefore includes display text and images for display to a user and markup dictating the presentation of the content. Extracting text from an RSS feed or from RSS content therefore may be carried out by retrieving display text from a web page or markup document and copying the retrieved text for translation. Such extracted display text implements some or all of the text content of the RSS feed. Similarly, extracting text from an calendar data may be carried out by retrieving text calendar entries describing events, as well as metadata in some cases and copying the retrieved text for translation.

The method of FIG. 3 also includes prompting (312) a user (100) to select a target language. Prompting (312) a user (100) to select a target language may be carried out through the pop-up display of a GUI selection screen described below with reference to FIG. 6.

The method of FIG. 3 also includes receiving (312) from the user (100) a selection (314) of a target language. Receiving from the user a selection of a target language may be carried out by receiving through a GUI selection screen a selection of an identification of one of a plurality of available target languages as discussed below with reference to FIG. 6.

The method of FIG. 3 also includes translating (316) the extracted text (308) in the source language (310) to translated text (318) in the target language (320). Translating (316) the extracted text (308) in the source language (310) to translated text (318) in the target language (320) is typically carried out by machine translation. Machine translation is a sub-field of computational linguistics that investigates the use of computer software to translate text or speech from one natural language to another. Machine translation performs substitution of words in one natural language for words in another. Using a corpus techniques, more complex translations may be attempted, allowing for better handling of differences in linguistic typology, phrase recognition, and translation of idioms, as well as the isolation of anomalies. Current machine translation software often allows for customization by domain or profession thereby improving the quality of the translation by limiting the scope of allowable substitutions of words or phrases. This technique is particularly effective in domains where formal or formulaic language is used.

The translation process often includes the steps of decoding the meaning of the source text and then re-encoding this meaning in the target language. To decode the meaning of the source text in its entirety, the machine translation engine must interpret and analyze all the features of the text, a process that requires information regarding the grammar, semantics, syntax, idioms, etc., of the source language, as well as the culture of its speakers. The machine translation engine needs the same in-depth knowledge to re-encode the meaning in the target language.

Machine translation engines often employ linguistic rules. Generally, rule-based methods parse text, usually creating an intermediary, symbolic representation, from which the text in the target language is generated. According to the nature of the intermediary representation, an approach is described as interlingual machine translation or transfer-based machine translation. These methods require extensive lexicons with morphological, syntactic, and semantic information, and large sets of rules. Interlingual machine translation is one instance of rule-based machine translation. According to this approach, the source language is transformed into a language-independent representation. The target language is then generated from the language-independent representation.

Machine translation engines may also employ a method based on dictionary entries. In such methods, the words are translated as a dictionary does—word by word, usually without much correlation of meaning between them. Dictionary lookups may be done with or without further. While this approach to machine translation is probably the least sophisticated, dictionary-based machine translation is ideally suitable for the translation of long lists of phrases such as inventories or simple catalogs of products and services.

The method of FIG. 3 also includes converting (324) the translated text to synthesized speech (326) in the target language (320). Converting (324) the translated text to synthesized speech (326) in the target language (320) may be carried out by processing the extracted text using a text-to-speech engine in order to produce a speech presentation of the translated text of the enterprise data. Examples of speech engines capable of converting extracted text to speech for recording in the audio portion of a media filed include, for example, IBM's ViaVoice Text-to-Speech, Acapela Multimedia TTS, AT&T Natural Voices™ Text-to-Speech Engine, and Python's pyTTS class. Each of these text-to-speech engines is composed of a front end that takes input in the form of text and outputs a symbolic linguistic representation to a back end that outputs the received symbolic linguistic representation as a speech waveform.

Typically, speech synthesis engines operate by using one or more of the following categories of speech synthesis: articulatory synthesis, formant synthesis, and concatenative synthesis. Articulatory synthesis uses computational biomechanical models of speech production, such as models for the glottis and the moving vocal tract. Typically, an articulatory synthesizer is controlled by simulated representations of muscle actions of the human articulators, such as the tongue, the lips, and the glottis. Computational biomechanical models of speech production solve time-dependent, 3-dimensional differential equations to compute the synthetic speech output. Typically, articulatory synthesis has very high computational requirements, and has lower results in terms of natural-sounding fluent speech than the other two methods discussed below.

Formant synthesis uses a set of rules for controlling a highly simplified source-filter model that assumes that the glottal source is completely independent from a filter which represents the vocal tract. The filter that represents the vocal tract is determined by control parameters such as formant frequencies and bandwidths. Each formant is associated with a particular resonance, or peak in the filter characteristic, of the vocal tract. The glottal source generates either stylized glottal pulses for periodic sounds and generates noise for aspiration. Formant synthesis generates highly intelligible, but not completely natural sounding speech. However, formant synthesis has a low memory footprint and only moderate computational requirements.

Concatenative synthesis uses actual snippets of recorded speech that are cut from recordings and stored in an inventory or voice database, either as waveforms or as encoded speech. These snippets make up the elementary speech segments such as, for example, phones and diphones. Phones are composed of a vowel or a consonant, whereas diphones are composed of phone-to-phone transitions that encompass the second half of one phone plus the first half of the next phone. Some concatenative synthesizers use so-called demi-syllables, in effect applying the diphone method to the time scale of syllables. Concatenative synthesis then strings together, or concatenates, elementary speech segments selected from the voice database, and, after optional decoding, outputs the resulting speech signal. Because concatenative systems use snippets of recorded speech, they have the highest potential for sounding like natural speech, but concatenative systems require large amounts of database storage for the voice database.

The method of FIG. 3 also includes recording (330) the synthesized speech (326) in the target language (320) in a digital media file (332). Examples of digital media files include MPEG 3 ('.MP3') files, MPEG 4 ('.mp4') files, Advanced Audio Coding ('AAC') compressed files, Advances Streaming Format ('ASF') Files, WAV files, and many others as will occur to those of skill in the art. Recording (330) the synthesized speech (326) in the target language (320) in a digital media file (332) typically includes storing the synthesized speech a media file that is supported by a digital audio player upon which enterprise data is to be rendered.

The method of FIG. 3 also includes storing (334) the media file (332) on a digital audio player (108). Storing (334) the media file (332) on a digital audio player (108) may be carried out by copying the media file and associated metadata containing the extracted text onto the digital audio player. The method of FIG. 3 also includes playing (336) the media file (3320 on the digital audio player (108) thereby rendering the synthesized speech (326) in the target language (320).

The method of FIG. 3 alternatively also includes storing (338) the translated text (318) as metadata associated with the media file and displaying (340) the metadata (318) describing the media file (332) thereby rendering the translated text (318) of the enterprise data (304). Storing (338) the translated text (318) as metadata associated with the media file may be carried out by inserting the extracted text in the media file itself, such as by inserting the extracted text in an ID3 tag in an MPEG file as discussed below with reference to FIG. 4. Storing (338) the translated text (318) as metadata associated with the media file may be also be carried out by storing the extracted text in a metadata file associated with the media file such as by storing the extracted text in an eXtenxible markup language ('XML') library file associated with an AAC compressed MPEG 4 file as discussed below with reference to FIG. 5.

The method of FIG. 3 includes alternatively displaying (340) the metadata (318) describing the media file (332) thereby rendering the translated text (318) of the enterprise data (304). Displaying (340) the metadata (318) describing the media file (332) is typically carried out by a digital audio player supporting the display of metadata associated with media files. Such digital audio players typically display, for example, metadata such as the artist and title of a song stored in a media file of a media file type supported by the digital audio player. Storing the translated text of the enterprise data as metadata associated with a digital file advantageously allows the translated text to be displayed in a digital audio player that does not support rendering the enterprise data in its conventional form As discussed above, translated text extracted from the enterprise data may be stored directly in the media file. For further explanation, therefore, FIG. 4 sets forth a block diagram of an MPEG file (402) such as an .mp4 file. The MPEG file of FIG. 4 includes an audio portion (318) of the media file. The audio portion of the MPEG file includes the binary audio data.

Figure 4:
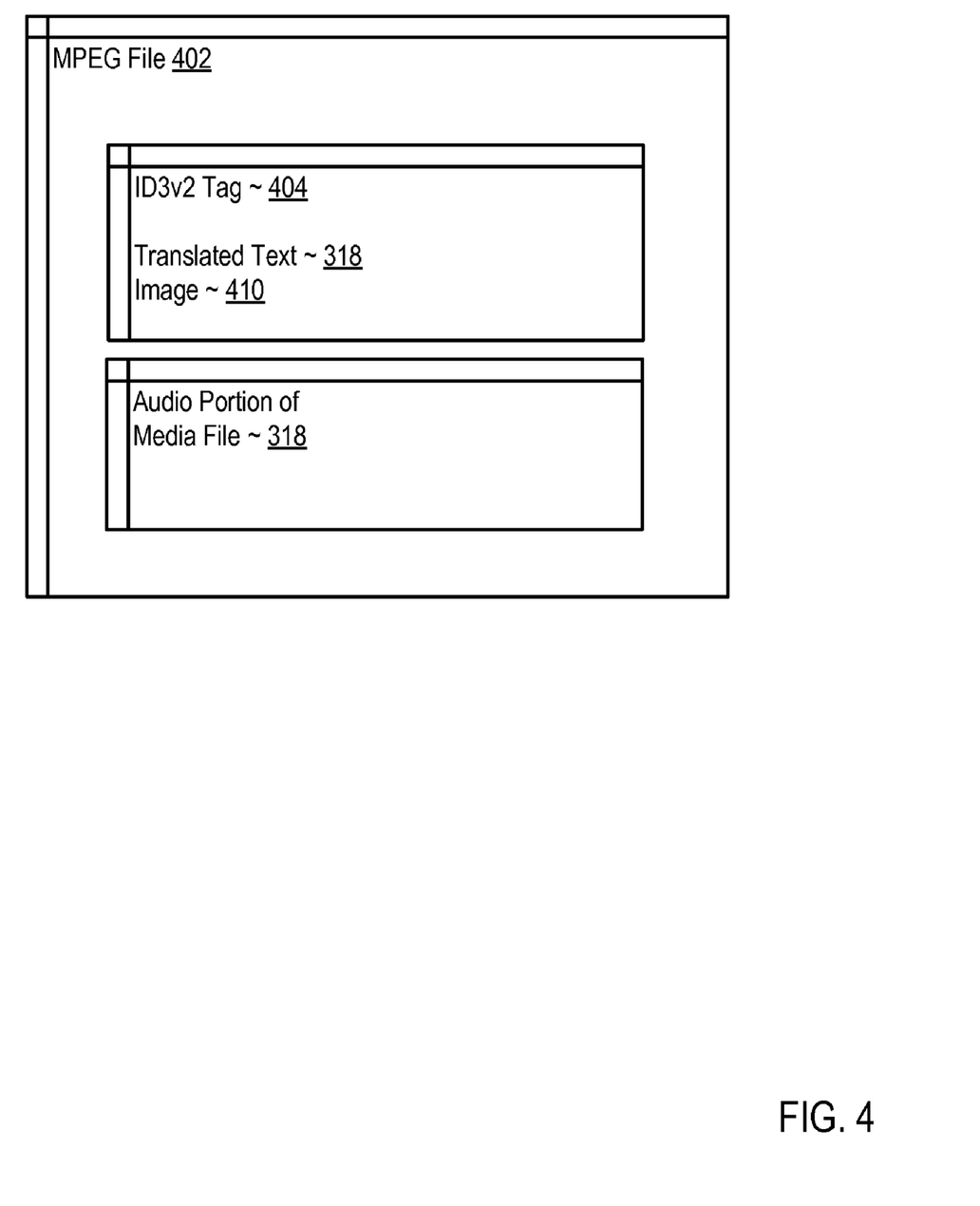
FIG. 4 sets forth a block diagram of an MPEG file such as an .mp4 file.

The MPEG file (402) of FIG. 4 has an ID3v2 tag (404) prepended to the audio portion (318) of the file that contains the translated text (318) and optionally one or more images (410) extracted from the enterprise data. An ID3v2 tag provides a container for metadata associated with the media file. An ID3v2 tag includes one or more frames supporting the inclusion of text, images, files, and other information. ID3v2 tags are flexible and expandable because parsers that do not support specific functions of the an ID3v2 tag will ignore those functions. ID3v2 supports Unicode thereby providing the ability to include translated text of many different languages. The maximum tag size of an ID3v2 tag is typically 256 megabytes and maximum frame size is typically 16 megabytes.

Figure 5:
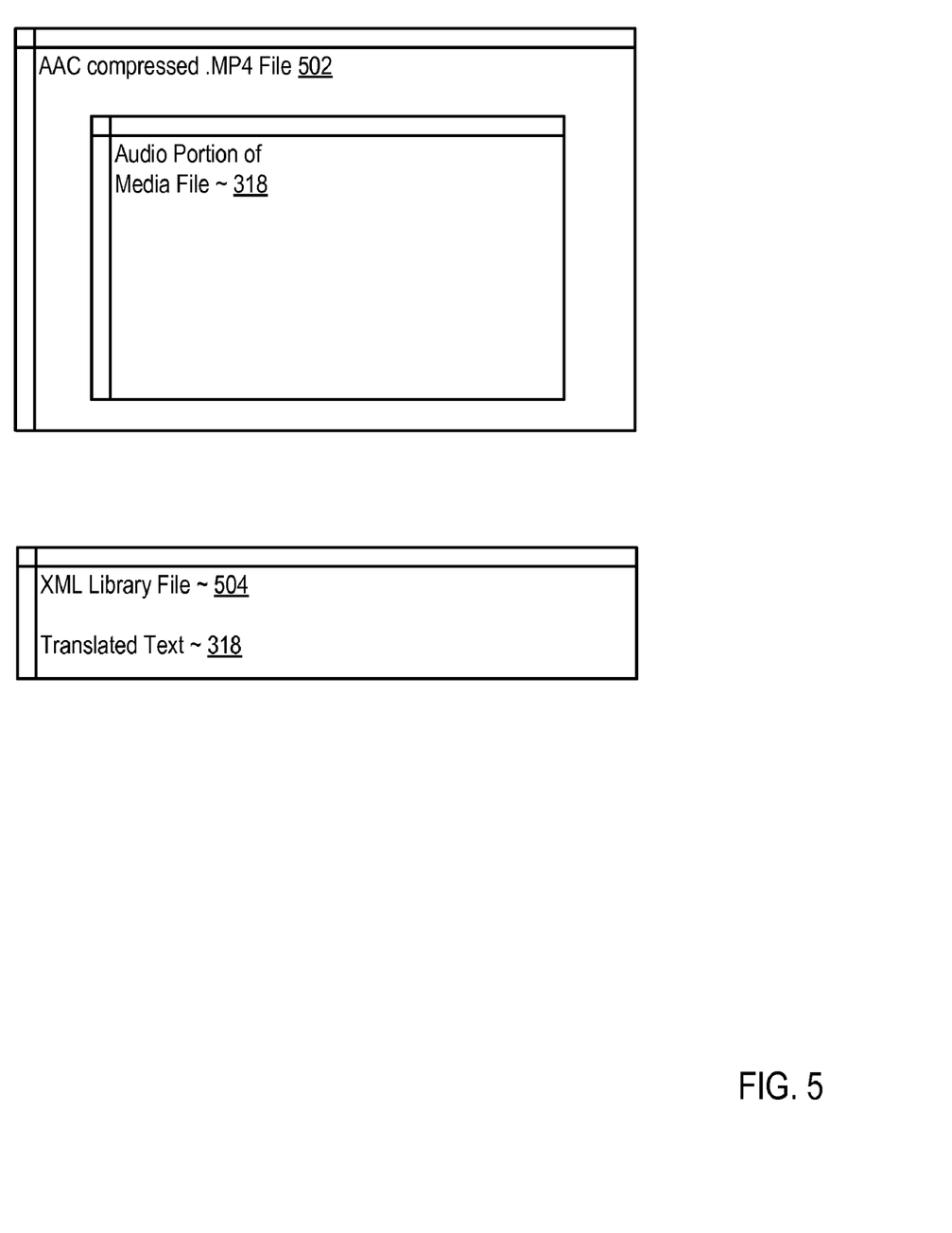
FIG. 5 sets forth a block diagram of an AAC compressed .mp4 file such as those supported by the iTunes musical jukebox and played on an iPod digital audio player FIG. 6 sets forth a block diagram of a graphical user interface ('GUI') selection screen that may be used to prompt a user to select a target language and receive from the user a selection of the target language.

As discussed above, the translated text may also be associated with the media file in a metadata file. For further explanation, therefore, FIG. 5 sets forth a block diagram of an AAC compressed .mp4 file (502) such as those supported by the iTunes musical jukebox and played on an iPod digital audio player. In the example of FIG. 5 the AAC compressed .mp4 file has included in the file the binary audio portion (318) of the digital media file. The AAC compressed .mp4 file (502) of FIG. 5 also has an associated metadata file implemented as an eXtenxible markup language ('XML') library file (504) that includes the translated text (318) of the enterprise data. iTunes digital audio application includes a single iTunes library file that contains metadata describing the contents of the media files comprising the iTunes library. The iTunes library file is implemented as an XML file, the format of which is defined by a flexible Document Type Definition ('DTD').

Figure 6:
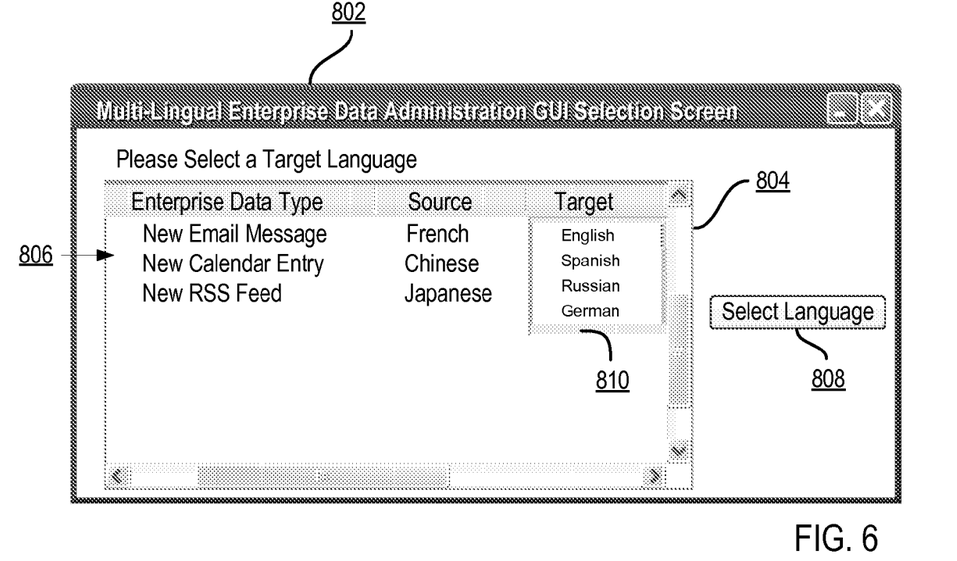

As described above, the method of FIG. 3 includes prompting (312) a user (100) to select a target language and receiving (312) from the user (100) a selection (314) of a target language. For further explanation, FIG. 6 sets forth a block diagram of a graphical user interface ('GUI') selection screen (802) that may be used to prompt a user to select a target language and receive from the user a selection of the target language by receiving through a GUI selection screen a selection of an identification of one of a plurality of available target languages. The GUI selection screen (802) of FIG. 6 includes a window (804) that includes a list of instances (806) of newly received enterprise data in the source language. In the example of FIG. 6 the instances (806) of newly received enterprise data in the source language include a newly received email message in French, a newly received calendar entry in Chinese, and a newly received RSS feed in Japanese.

The GUI selection screen (802) of FIG. 6 also includes pull-down menu (810) that includes a list of identifications of target languages available as the target language for translation of each instance of the newly received enterprise data. The pull down menu of (810) includes the identifications of English, Spanish, Russian and German as available target languages available for translation. In the example of FIG. 6, a user is empowered through the pull-down menu to highlight a selection of a target language and select the highlighted target language by invoking the GUI button (808) labeled 'Select Language.'

Figure 7:
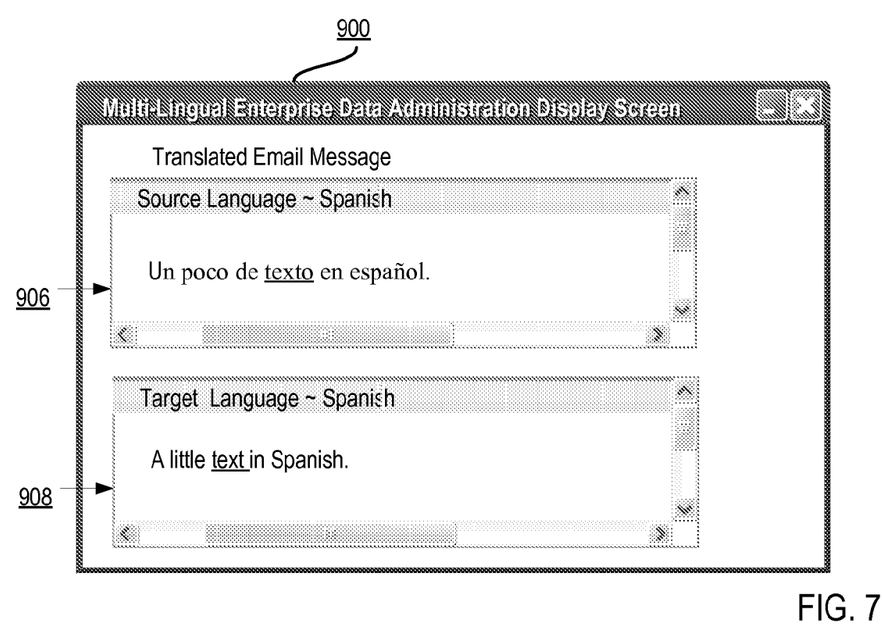
FIG. 7 sets forth a block diagram of a GUI display screen that includes two text boxes for displaying the text in the source language together with the translated text in the target language.

As an aid to users understanding the translated text of the enterprise data, some embodiments of multilingual administration of enterprise data according to the present invention also include displaying in a GUI text box the text in the source language together with the translated text in the target language. For further explanation, FIG. 7 sets forth a block diagram of a GUI display screen (900) that includes two text boxes (906 and 908) for displaying the text in the source language together with the translated text in the target language. In the example of FIG. 7 the text of an email message 'Un poco de texto en espanol.' in the source language of Spanish is displayed together with the translated text 'A little text in Spanish.' in the target language of English. Displaying in a GUI text box the text in the source language together with the translated text in the target language facilitates a multilingual user by providing both the source and target language for the user's review.

As a further aid to users understanding the translated text of the enterprise data, some embodiments of multilingual administration of enterprise data according to the present invention also include playing the synthesized speech converted from the translated text while displaying in a GUI text box the text in the source language together or separate from the translated text in the target language. In the example of FIG. 7 the word 'text' is highlighted by displaying the word with underlining to illustrate to the user that word 'text' is being played back synchronously in synthesized speech with the display of the text of the enterprise data. Such synchronous display and playback may further facilitate users understanding of multilingual enterprise data.

Example embodiments of the present invention are described largely in the context of a fully functional computer system for multilingual administration of enterprise data. Readers of skill in the art will recognize, however, that the present invention also may be embodied in a computer program product disposed on computer readable signal bearing media for use with any suitable data processing system. Such computer readable signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for multilingual administration of enterprise data, the method comprising:
retrieving, by at least one device, enterprise data comprising text and metadata;
extracting, by the at least one device, the text and the metadata from the enterprise data for rendering from a digital media file, the extracted text and the extracted metadata being in a source language;
selecting, by the at least one device, a target language from among a plurality of target languages based on a data type for the enterprise data;
translating, by the at least one device, the extracted text and the extracted metadata in the source language to translated text and translated metadata in the target language;
converting, by the at least one device, the translated text to synthesized speech in the target language;
recording, by the at least one device, the synthesized speech in the target language in a digital media file; and
storing the translated text as metadata associated with the digital media file.

2. The method of claim 1 further comprising:
storing the digital media file on a digital audio player; and
playing the digital media file on the digital audio player thereby rendering the synthesized speech in the target language.

3. The method of claim 1 wherein the enterprise data comprises email messages, RSS feeds, and calendar entries.

4. The method of claim 1 wherein receiving from the user a selection of a target language further comprises receiving through a graphical user interface ('GUI') selection screen a selection of an identification of one of a plurality of available target languages.

5. The method of claim 1 further comprising displaying in a GUI text box the text in the source language together with the translated text in the target language.

6. The method of claim 1 further comprising displaying the metadata describing the digital media file thereby rendering the translated text of the enterprise data.

7. The method of claim 1, wherein the translating comprises:
   decoding meaning of the text in the source language, wherein the decoding comprises decoding derived from at least one of grammar, semantics, syntax, and idioms; and
   re-encoding the meaning of the text into the target language based on the decoding derived from the at least one of grammar, semantics, syntax, and idioms.

8. A system for multilingual administration of enterprise data, the system comprising:
   a processor;
   an administration module operable on the processor, the administration module configured to
      retrieve enterprise data comprising text and metadata;
      extract the text and the metadata from the enterprise data for rendering from a digital media file, the extracted text and the extracted metadata being in a source language;
      select a target language from among a plurality of target languages based on a data type for the enterprise data;
      translate the extracted text and the extracted metadata in the source language to translated text and translated metadata in the target language;
      convert the translated text to synthesized speech in the target language; and
      record the synthesized speech in the target language in a digital media file; and
      store the translated text as metadata associated with the digital media file.

9. The system of claim 8 wherein the administration module is configured to:
   store the digital media file on a digital audio player; and
   play the digital media file on the digital audio player thereby rendering the synthesized speech in the target language.

10. The system of claim 8 wherein the enterprise data comprises email messages, RSS feeds, and calendar entries.

11. The system of claim 8 wherein the administration module is configured to receive from the user a the selection of the target language through a graphical user interface ('GUI') selection screen a selection of an identification of one of a plurality of available target languages.

12. The system of claim 8 wherein the administration module is configured to display in a GUI text box the text in the source language together with the translated text in the target language.

13. The system of claim 8 wherein the administration module is configured to display the metadata describing the digital media file thereby rendering the translated text of the enterprise data.

14. A computer program product for multilingual administration of enterprise data, the computer program product comprising:
   non-transitory machine-readable medium having computer usable program code embodied therewith, the computer usable program code comprising a computer usable program code configured to,
   retrieve enterprise data comprising text and metadata;
   extract the text and the metadata from the enterprise data for rendering from a digital media file, the extracted text and the extracted metadata being in a source language;
   select a target language from among a plurality of target languages based on a data type for the enterprise data;
   translate the extracted text and the extracted metadata in the source language to translated text and translated metadata in the target language;
   convert the translated text to synthesized speech in the target language; and
   record the synthesized speech in the target language in a digital media file; and
   store the translated text as metadata associated with the digital media file.

15. The computer program product of claim 14, wherein the computer usable program code comprises computer usable program code configured to:
   store the digital media file on a digital audio player; and
   play the digital media file on the digital audio player thereby rendering the synthesized speech in the target language.

16. The computer program product of claim 14 wherein the enterprise data comprises email messages, RSS feeds, and calendar entries.

17. The computer program product of claim 14 wherein the computer usable program code is configured to receive from the user the a selection of the through a graphical user interface ('GUI') selection screen a selection of an identification of one of a plurality of available target languages.

18. The computer program product of claim 14, wherein the computer usable program code comprises computer usable program code configured to display in a GUI text box the text in the source language together with the translated text in the target language.

19. The computer program product of claim 14, wherein the computer usable program code comprises computer program instructions for display the metadata describing the media file thereby rendering the translated text of the enterprise data.

20. The computer program product of claim 14, wherein the computer usable program code configured to translate comprises:
   computer usable program code configured to decode meaning of the text in the source language, wherein the decoding comprises decoding derived from at least one of grammar, semantics, syntax, and idioms; and
   computer usable program code configured to re-encode the meaning of the text into the target language based on the decoding derived from the at least one of grammar, semantics, syntax, and idioms.

* * * * *